Sept. 18, 1956   A. M. FOOTE   2,763,761
ELECTRIC HEATER
Filed July 20, 1954
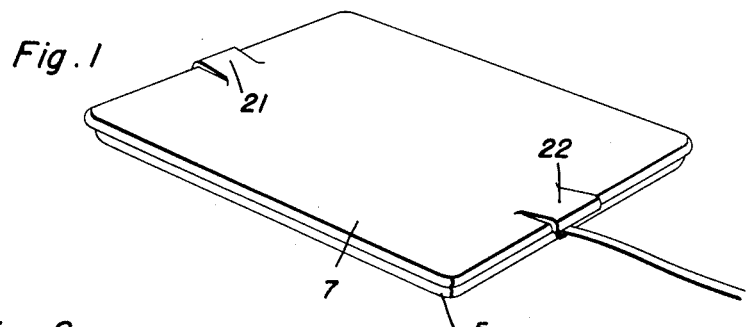
Fig. 1
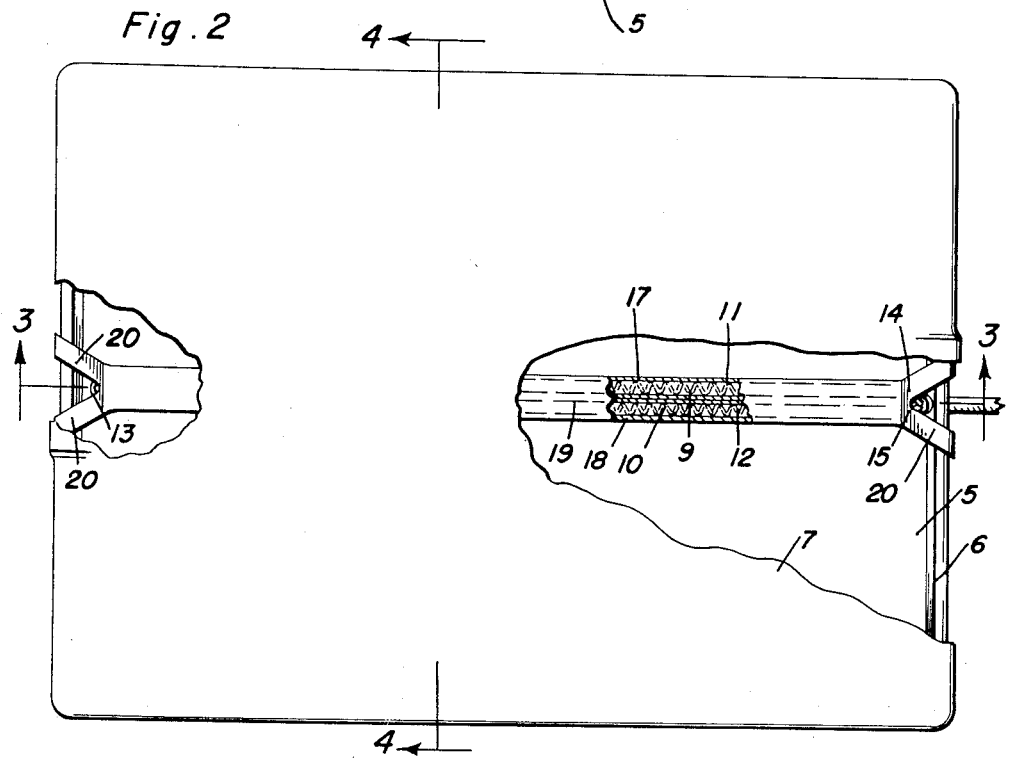
Fig. 2
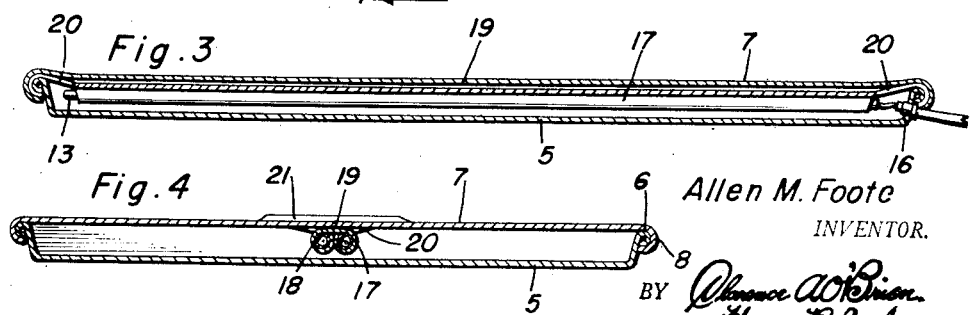
Fig. 3
Fig. 4
Allen M. Foote
INVENTOR.

United States Patent Office 2,763,761
Patented Sept. 18, 1956

2,763,761

ELECTRIC HEATER

Allen M. Foote, Hendersonville, N. C.

Application July 20, 1954, Serial No. 444,487

1 Claim. (Cl. 219—19)

The present invention relates to electric heaters for use as a crispness restorer for packaged cereals, crackers and other food products, as well as a de-humidifier in general.

An important object of the invention is to provide a substantially shallow hollow body having a cover and in which an electric heating element is supported closely under the cover to heat the cover for use wherever a heat exchange element of this character may be needed.

Another object is to provide novel supporting means for the electric heating element in the hollow body.

A further object is to provide a device of this character of simple and practical construction, which is efficient and reliable in operation, relatively inexpensive to manufacture and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is enlarged top plan view with parts broken away and shown in section;

Figure 3 is a longitudinal sectional view taken on a line 3—3 of Figure 2; and

Figure 4 is a transverse sectional view taken on a line 4—4 of Figure 2.

Referring now to the drawings in detail, wherein for the purpose of illustration I have disclosed a preferred embodiment of my invention, the numeral 5 designates a substantially shallow pan of rectangular shape and formed with a beading 6 at its rim. The top of the plan is closed by a flat cover which is formed at its edge portion with a lip 8 engaging the beading to lock the cover on the pan.

A pair of electric heating units 9 and 10 are enclosed in glass tubes 11 and 12 respectively and the units are connected to each other at one end by a semi-circular connector 13 and circuit wires 14 and 15 are connected to the other ends of the units and lead outwardly at one end of the pan through a grommet 16 at one end of the pan to a suitable electric outlet.

The glass tubes 11 and 12 are supported in a pair of parallel metal tubes 17 and 18 formed by rolling the longitudinal edges of a metal strip 19 inwardly under the strip and with the back of the strip supported closely under the cover 7 by hanger straps 20 at each end of the metal tubes and engaged over the beading 6 of the pan. Tabs 21 and 22 are partially cut from the opposite ends of the cover for bending upwardly sufficiently to accommodate the hanger straps.

The heating units are supported at the longitudinal center of the pan and closely under the cover to heat the cover to a greater degree at the center thereof and to a gradually lesser degree toward each side edge of the cover whereby food products requiring varying degrees of heat for restoring crispness thereto may be placed on top of the cover at an appropriate position to avoid damage to the food.

The heat radiated by the cover may be used as a de-humidifier wherever needed and for other purposes where an electric heater may be found useful.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An electric heater of the class described comprising a substantially shallow pan, a cover for the pan, an elongated electric heating element in the pan and including a pair of glass tubes having electric units enclosed therein, a pair of metal tubes in which the glass tubes are supported, and hangers extending outwardly at the ends of the metal tubes and engaging the rim of the pan at opposite sides of the latter to support the heating element in an elevated position in the pan closely under the cover.

References Cited in the file of this patent

UNITED STATES PATENTS

| | | |
|---|---|---|
| 1,908,055 | Riley et al. | May 9, 1933 |
| 2,511,910 | Foote | June 20, 1950 |
| 2,521,480 | Roberts | Sept. 5, 1950 |
| 2,567,434 | Hoskings | Sept. 11, 1951 |
| 2,606,989 | Gomersall | Aug. 12, 1952 |